United States Patent
Hodder et al.

(10) Patent No.: US 7,523,320 B2
(45) Date of Patent: Apr. 21, 2009

(54) FISCAL DATA RECORDER WITH PROTECTION CIRCUIT AND TAMPER-PROOF SEAL

(75) Inventors: Leonard B. Hodder, Toronto (CA); William Gugg, Schomberg (CA)

(73) Assignee: Seiko Epson Corporation, Tokyo (JP)

( * ) Notice: Subject to any disclaimer, the term of this patent is extended or adjusted under 35 U.S.C. 154(b) by 1364 days.

(21) Appl. No.: 10/420,416

(22) Filed: Apr. 22, 2003

(65) Prior Publication Data

US 2004/0255141 A1    Dec. 16, 2004

(51) Int. Cl.
G06F 12/00  (2006.01)
(52) U.S. Cl. .................. 713/194; 713/193; 713/200; 713/189; 705/64; 705/19; 705/16; 705/31; 714/718; 711/163; 711/103; 235/2; 235/7 R; 235/382
(58) Field of Classification Search .......... 235/2, 235/7 R, 382; 705/19, 16, 31, 64; 713/200, 713/194, 193, 189, 300; 340/687; 711/163, 711/103; 714/718
See application file for complete search history.

(56) References Cited

U.S. PATENT DOCUMENTS

| | | | |
|---|---|---|---|
| 4,144,567 A | | 3/1979 | Tadakuma et al. |
| 4,258,430 A | * | 3/1981 | Tyburski ................... 714/1 |
| 5,396,417 A | | 3/1995 | Burks et al. |
| 5,521,876 A | * | 5/1996 | Hattori et al. ............ 365/221 |
| 5,644,724 A | | 7/1997 | Cretzler |
| 5,774,872 A | | 6/1998 | Golden et al. |
| 5,799,283 A | | 8/1998 | Francisco et al. |
| 5,862,147 A | * | 1/1999 | Terauchi .................. 714/718 |
| 5,875,433 A | | 2/1999 | Francisco et al. |
| 5,912,849 A | * | 6/1999 | Yasu et al. ................ 365/195 |
| 5,933,595 A | * | 8/1999 | Iizuka et al. .............. 714/35 |
| 6,032,237 A | * | 2/2000 | Inoue et al. .............. 711/163 |
| 6,078,899 A | | 6/2000 | Francisco et al. |
| 6,199,049 B1 | | 3/2001 | Conde et al. |
| 6,215,717 B1 | * | 4/2001 | Takeguchi et al. ...... 365/230.03 |
| 6,330,648 B1 | * | 12/2001 | Wambach et al. .......... 711/163 |
| 6,360,208 B1 | | 3/2002 | Ohanian et al. |
| 6,415,341 B1 | | 7/2002 | Fry, Sr. et al. |
| 6,501,558 B2 | * | 12/2002 | Ebina et al. .............. 358/1.15 |
| 6,611,904 B1 | * | 8/2003 | Uguen ..................... 711/163 |
| 6,646,565 B1 | * | 11/2003 | Fu et al. ................... 340/687 |
| 6,675,281 B1 | * | 1/2004 | Oh et al. .................. 711/207 |
| 2002/0018130 A1 | * | 2/2002 | Suemoto et al. ........... 348/231 |
| 2003/0019770 A1 | * | 1/2003 | Hodes ..................... 206/308.2 |
| 2005/0259484 A1 | * | 11/2005 | Newell .................... 365/195 |

FOREIGN PATENT DOCUMENTS

| | | | |
|---|---|---|---|
| CN | 1166006 | | 11/1997 |
| DE | 04437460 A1 | * | 4/1996 |
| EP | 180978 | | 5/1986 |
| JP | 07-249177 | | 9/1995 |
| JP | 08006865 A | * | 1/1996 |
| JP | 11-283125 | | 10/1999 |
| JP | 2000-011257 | | 1/2000 |
| JP | 2000-76030 | | 3/2000 |
| LV | 12636 | | 6/2001 |
| WO | 9966465 | | 12/1999 |

* cited by examiner

Primary Examiner—Hong Kim (57) ABSTRACT

A fiscal data recorder for storing transaction related data in a point of sale system is provided with a processing unit receiving the transaction related data. Memory in communication with the processing unit is operable to store the transaction related data. A protection circuit acting between the processing unit and the memory inhibits the electronic tampering with the transaction data stored in the memory.

16 Claims, 8 Drawing Sheets

FISCAL DATA RECORDER WITH PROTECTION CIRCUIT AND TAMPER-PROOF SEAL

FIELD OF THE INVENTION

The present invention relates in general to point-of-sale ("POS") systems and more specifically to a point-of-sale fiscal data recorder for storing tax data associated with purchase transactions on behalf of a taxing authority.

BACKGROUND OF THE INVENTION

In almost every country, merchants are required to collect tax on behalf of the governing taxing authority when a purchase transaction is completed with a purchaser. To facilitate the determination of the amounts of purchase transactions and the appropriate amount of tax to be collected, POS systems are used by most merchants. Typical POS systems include fiscal printers that print customer receipts and control receipts showing the amount of taxes collected by the merchant on behalf of the taxing authority. Periodically, merchants are required to submit these receipts to the taxing authority, with payments commensurate with the amount of tax collected.

Taxing authorities have in the past experienced difficulties with this paper-based method because, in many instances, merchants fail to submit the complete set of control receipts for a period.

To deal with the inefficiencies associated with the above-described tax collection method, electronic collection of fiscal data has been proposed. In POS systems that print electronic fiscal data collection, a controller having a fiscal memory module to store fiscal data is connected between the host terminal and the printer. When a purchase transaction is completed, the fiscal data is stored in a fiscal memory module obviating the need to generate paper receipts.

For example, U.S. Pat. No. 5,644,724 to Cretzler is directed to a point-of-sale tax collection system and method for automatically submitting taxes from a merchant site to a taxing authority. A merchant computer, electronically identifiable by a unique tax identification number, automatically stores the tax amount accrued during a customer transaction. A computer at the merchant's bank periodically accesses the merchant computer and transfers the accumulated tax amount to the tax authority's bank.

U.S. Pat. No. 5,774,872 to Golden et al. is directed to an automated taxable transaction reporting system. A number of merchant point-of-sale terminals are networked to a data collection subsystem, which is in turn, connected to a central computer. The central computer accepts inputs from multiple data collection subsystems and generates transaction tax reports for submission to the taxing authority.

U.S. Pat. No. 5,799,283 to Francisco et al. is directed to a point-of-sale tax reporting and automatic collection system. A "smart" tax register, located at the retailer, calculates the sales tax due during a transaction and then immediately forwards the transaction and sales data to a remote computer operated by a local taxing authority. Information from each local taxing authority is periodically compiled and collected by the national taxing authority for use in collection reporting.

U.S. Pat. No. 6,199,049 to Conde et al. is directed to a point-of-sale device for maintaining a secure electronic journal. Transaction data from a point-of-sale terminal is stored in non-volatile RAM and an encrypted digital signature is generated based on transaction data. The transaction data and corresponding digital signature are transferred to a separate journal memory for permanent storage. A taxing authority may audit the transaction data.

U.S. Pat. No. 6,360,208 to Ohanian et al. is directed to an automatic tax collection apparatus and method. A machine-readable code is applied to a saleable item and then associated in a central database with information regarding the item manufacturer and tax payment information for the item. Tax payment may be tracked by first applying the code to the saleable item and entering item data corresponding to the code into a database, such as whether tax has been paid on the sale of the item. The data may be verified by having a machine read the code and collect information regarding the tax payment.

Although these electronic fiscal data collection systems have proven to be better at providing more accurate tax collection information than the paper receipt systems, problems exist. These electronic fiscal data collection systems are subject to tampering. The software that controls writing of tax data to memory can be altered. This has enabled inaccurate data to be written to memory, memory to be overwritten and tax records to be cancelled. When this occurs, inaccurate tax data is submitted to the taxing authority.

Accordingly, there remains a need to improve the integrity of electronic fiscal data. It is therefore an object of the present invention to provide a novel fiscal data recorder and fiscal memory module for the same.

SUMMARY OF THE INVENTION

The present invention provides a fiscal data recorder having a fiscal memory module for storing fiscal data in a secure manner. The fiscal memory module comprises programmable memory and a write-protection circuit in a tamper-proof package. The fiscal memory module is in communication with a main circuit board of the fiscal data recorder via a detachable cable which allows replacement of the fiscal memory module, alternate mounting of the module as required by the tax authorities, and coupling of the fiscal memory module to other devices for security auditing purposes.

To provide electronic security, data writes to the memory are first latched in the write-protection circuit. When a data write to the memory is attempted, the write-protection circuit checks the target area of the memory to ensure that it has not been written to previously. If the target area of the memory is clear, the data is written to the memory at the specified address. If the target area of the memory has been written to previously, the write-protection circuit inhibits the data from being written to the memory and returns an error status to the controlling application.

In accordance with one aspect of the present invention there is provided a fiscal data recorder for storing transaction related data, comprising:

a processing unit receiving transaction related data;

memory communicating with said processing unit for storing transaction related data; and a protection circuit acting between said processing unit and said memory, said protection circuit inhibiting electronic tampering with said memory.

In accordance with another aspect of the present invention, there is provided a fiscal data recorder for storing transaction related data, comprising:

a main circuit board;

a processing unit mounted on said main circuit board for receiving transaction related data;

removable memory mounted on said main circuit board for storing transaction related data;

a tamper-proof seal acting between said memory and said main circuit board; and a protection circuit for controlling access to said memory and inhibiting data stored in said memory from being overwritten; and a tamper-proof seal inhibiting physical access to said memory and said protection circuit.

Because the memory and the write-protection circuit are coupled and sealed within tamper-proof packaging, unauthorized or fraudulent physical and electronic access to the memory is prevented.

BRIEF DESCRIPTION OF THE DRAWINGS

A detailed description of the preferred embodiment is set forth in detail below, with reference to the following drawings, in which.

DETAILED DESCRIPTION OF THE INVENTION

The present invention relates generally to a fiscal data recorder having a fiscal memory module to store fiscal data relating to transactions so that accurate tax data is passed to the taxing authority. The fiscal memory module is designed to inhibit both physical and electronic tampering thereby to ensure the integrity of the tax data. A preferred embodiment of the present invention will now be described with reference to FIGS. 1 to 12.

Figure 1:
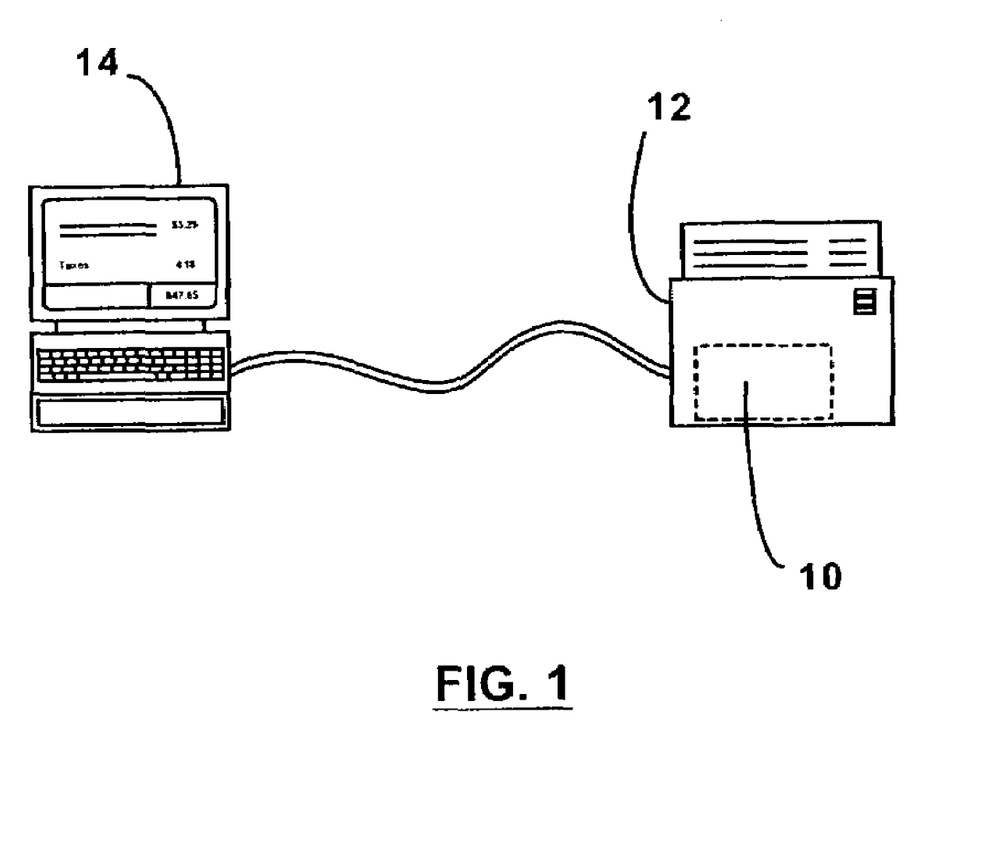
FIG. 1 shows a fiscal data recorder including a fiscal memory module in accordance with the present invention, installed in a printer connected to a host device.

Turning now to FIG. 1, a fiscal data recorder in accordance with the present invention is shown and is generally identified by reference numeral 10. The fiscal data recorder may be integrated into the printer to prevent tampering or bypassing. As can be seen, fiscal data recorder 10 is installed in a printer 12 that communicates with a host device 14, such as a PC-based electronic cash register or a POS device, which executes a transaction application. Fiscal data recorder 10 stores fiscal data relating to transactions carried out by the host device 14 in a secure manner.

Figure 2:
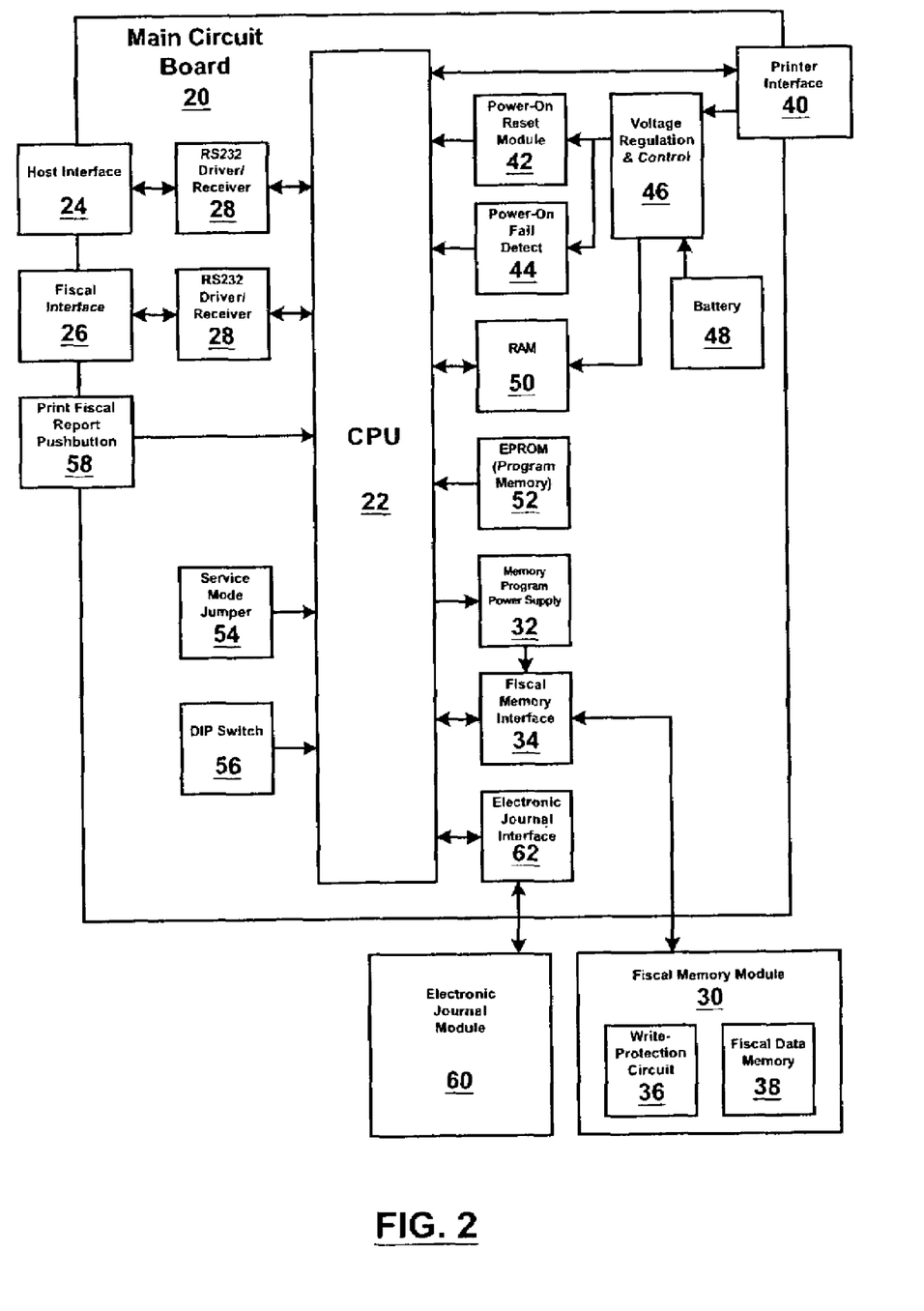
FIG. 2 is a block diagram of the fiscal data recorder illustrated in FIG. 1.

FIG. 2 better illustrates the fiscal data recorder 10. As can be seen, fiscal data recorder 10 includes a main circuit board 20 supporting most of the hardware components of the fiscal data recorder. In particular, the main circuit board 20 supports a central processing unit ("CPU") 22, such as a Toshiba TMP94C251AF processor, having bidirectional connections to a host interface 24 and a fiscal interface 26 via respective RS232 driver/receivers 28. Host interface 24 provides an appropriate data communications interface to a PC-based host device 14 while the fiscal interface 26 provides an appropriate data communications interface to the tax authority's fiscal equipment. The host and fiscal interfaces 24 and 26 are preferably standard, RS232 compatible communications ports in the present invention.

A fiscal memory module 30 is connected to the CPU 22 and to a fiscal memory program power supply 32 via a memory interface 34. Fiscal memory module 30 includes a Complex Programmable Logic Device (CPLD) write-protection circuit 36 and a 512 KB one-time programmable erasable/programmable read-only memory ("OTP-EPROM") fiscal data memory 38. Access to the fiscal data memory 38 for reading or writing is only permitted via write-protection circuit 36.

In addition, the CPU 22 also has a connection to a printer interface 40 that supports TTL-level synchronous or asynchronous serial communications via a proprietary Universal Interface Bus or any other suitable bus. Also included are a power-on reset module 42, a power-fail detect module 44, and a voltage regulation and control module 46 coupled to a battery 48. A 128 KB RAM module 50 and a 512 KB EPROM program memory 52 are connected directly to the CPU 22. BIOS firmware is stored on the EPROM program memory 52 for execution by the CPU 22.

Service mode jumper 54 is available for enabling the board to be operated in a service mode, and DIP switches 56 are available for use by the application for option selection. In the present invention, the service mode may be used to download fiscal data to the auditor's fiscal equipment via the fiscal interface 26, but can also allow for other functionality. An externally accessible pushbutton 58 is connected to the CPU 22 and can be used for printing special fiscal reports, as required by the application. Such reports can include detailed transaction information or may summarize fiscal activity.

An optional electronic journal module 60 is shown connected to the CPU 22 via an electronic journal interface 62, such as a socket and pin configuration.

To prevent electronic tampering, the EPROM fiscal data memory 38 is coupled to the write-protection circuit 36. The write-protection circuit 36 is a CPLD, which prevents the memory from being overwritten or tampered with electronically. To this end, the CPLD implements a circuit that prevents any software from overwriting any programmed memory cell. The firmware BIOS of the EPROM program memory 52 provides read/write memory access to the application executing on host device 14 and allows the printer interface 40 to be configured.

Access to the fiscal memory module 30 is restricted and only leads connected to the write-protection circuit 36 are physically accessible, inhibiting physical tampering with the memory module 30 itself. Further, the write-protection circuit 36 acts to protect the fiscal data memory 38 from electronic tampering, requiring a specific protocol to be followed before the fiscal data memory 38 can be written to. The fiscal memory module 30 is separated from the main board 20 by a cable, and may be connected to a specialized fiscal reading device for data reading and inspection by a taxing authority. In a typical application, the fiscal data memory 38 has a unique serial number corresponding to the merchant and is removable by a government inspector so that it may be replaced with new, empty memory.

The electronic journal module 60 provides up to 128 MB of electronic journal storage for use by a merchant in storing the transaction data, augmenting the data stored in the removable fiscal memory module 30. This electronic journaling can be used with printers that do not print double copies of receipts, or by establishments that typically clear their receipts electronically at the end of day/week for inventory and revenue purposes. While the fiscal memory module 30 records the minimum required information for remission of taxes levied at the point of sale, the journal module 60 can record considerably more information for record-keeping purposes. The electronic journal module 60 uses a dedicated microcontroller to handle read and write operations to a compact flash memory module. The journaling memory is populated using separate programming hooks offered by the same BIOS as used for recording fiscal data on the removable fiscal memory module 30, but it has a dedicated microcontroller to handle reading and writing.

The microcontroller of the electronic journal module 60 compresses data relating to each transaction, since the amount of data required to be stored is much larger than that required for the fiscal data recorder. A different compression algorithm is used for different types of information to be stored. For instance, the header record for a transaction is compressed differently than the item record for the transaction.

Figure 3:
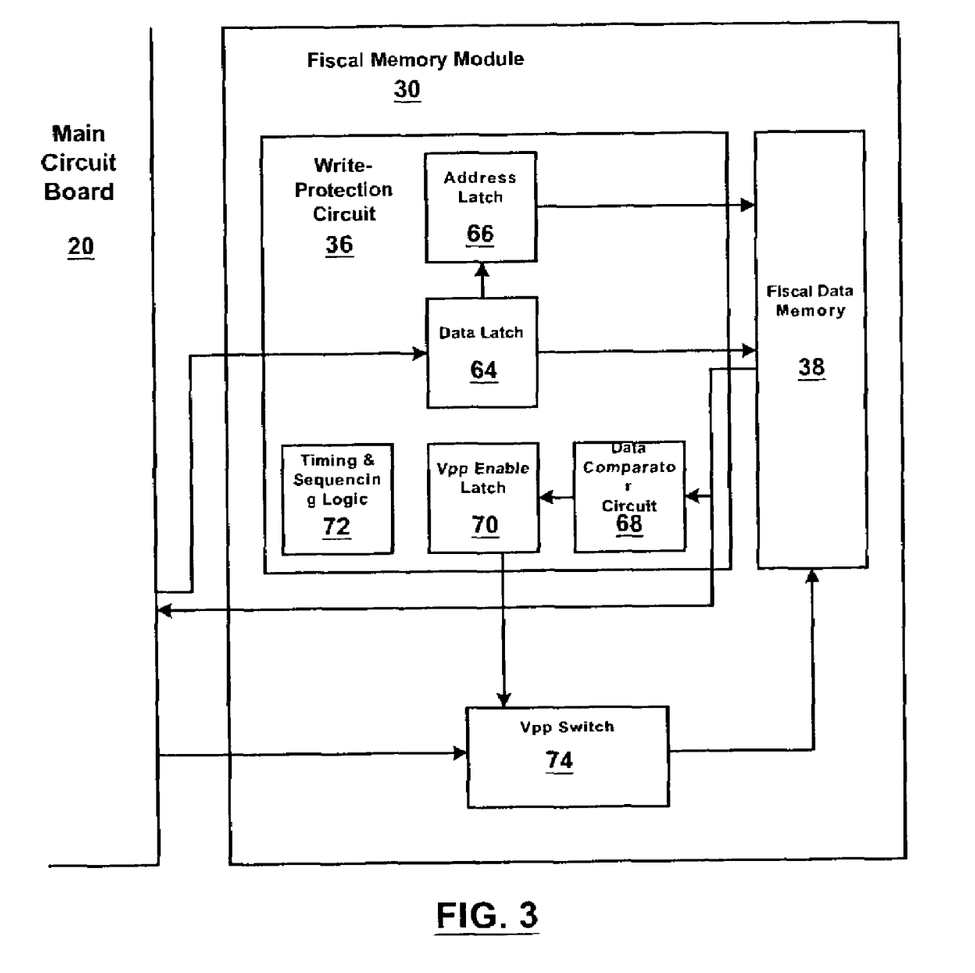
FIG. 3 is a block diagram of the fiscal memory module illustrated in FIG. 2.

FIG. 3 better illustrates the memory module. As can be seen, write-protection circuit 36 is comprised of a CPLD, incorporating a data latch 64, an address latch 66, a Vpp enable latch 70, a data comparator circuit 68 and a timing and sequencing logic circuit 72. Also shown on the removable fiscal memory module 30 are the fiscal data memory 38 and a Vpp switch 74.

Desired data writes are comprised of a set of data presented to data latch 64, a data buffer, and an address presented to address latch 66 indicating where the data is to be written. Data comparator circuit 68 captures the data byte read from the point in fiscal data memory 38 corresponding to the latched address during a read cycle. Upon determination of a value of 0xFF (blank), the comparator 68 signals the Vpp enable latch 70 to allow a programming voltage Vpp to be applied to the fiscal data memory 38 via Vpp switch 74. Timing and sequencing logic 72 controls the timing and order of the latching, reading and writing performed by the various components in the write-protection circuit.

The write-protection circuit 36 requires a specific write sequence to be used for writing to a particular block of fiscal data memory 38. If the write sequence is not followed precisely, then the write-protection circuit 36 will inhibit the write sequence from being performed. The operation of the fiscal data recorder 10 will now be described with particular reference to FIG. 4.

Figure 4:
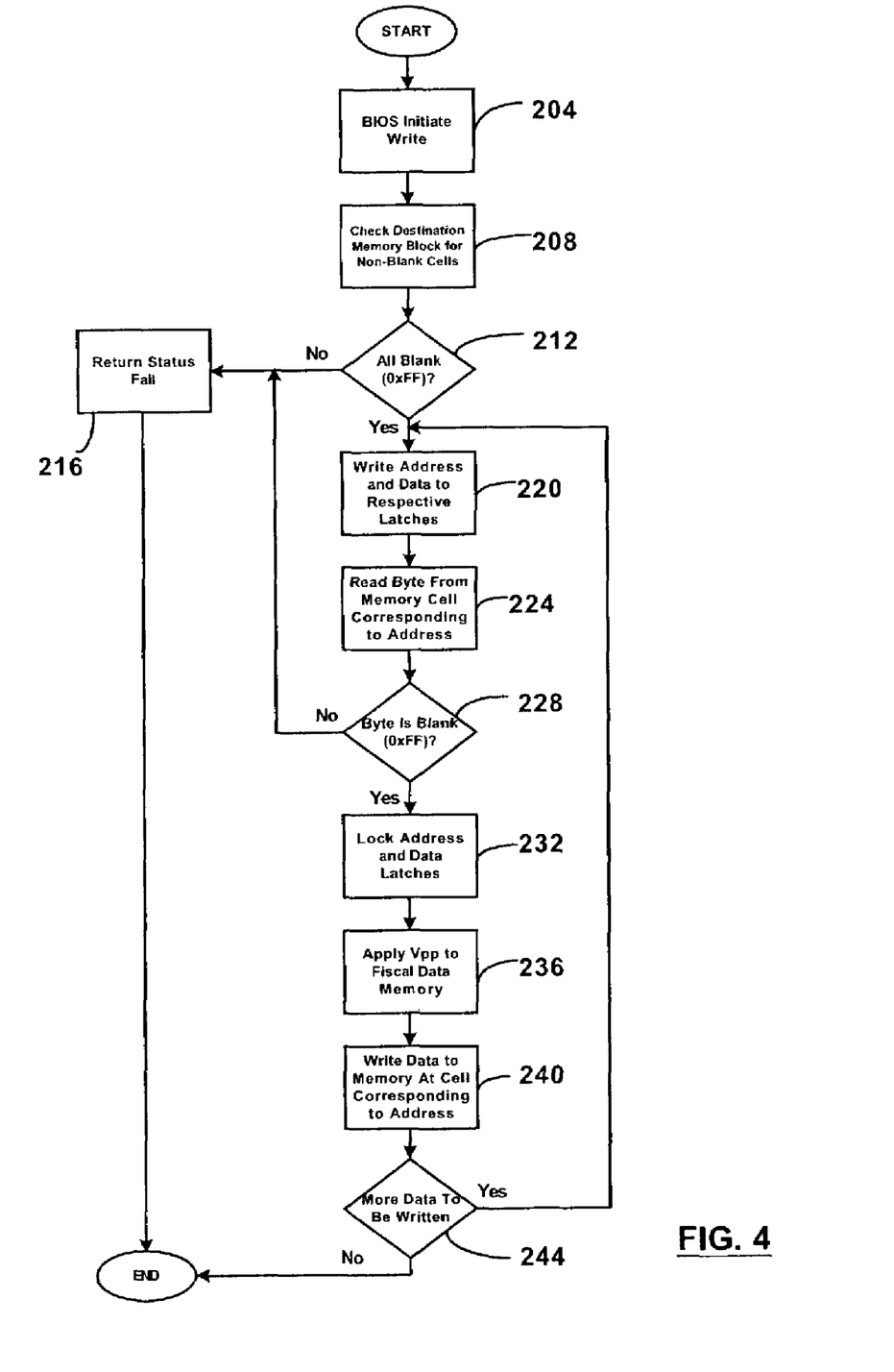
FIG. 4 is a flowchart showing the steps performed during a write sequence to the fiscal memory module.

When a reset, cold boot or warm boot occurs, the removable fiscal memory module 30 is initialized by the CPU 22. Initialization commences with the BIOS confirming that the CPLD write-protection circuit 36 is present by writing the CPLD ID pattern to the write-protection circuit 36, and checking for a valid response. Next, the EPROM voltage setting is checked and the EPROM manufacturer and type are read from the EPROM's electronic signature. Finally, the unused space in the fiscal data memory 38 is determined by finding the last address of memory that is populated. In the present invention, each memory address corresponding to a memory cell is checked, starting with the last and proceeding decrementally, for a meaningful entry. Upon discovery of the last memory address utilized in the fiscal data memory 38, the memory address is reported to the application executing on the host device 14. If the CPLD ID does not respond correctly, or the EPROM electronic signature is incorrect, then an error status is reported by the BIOS to the application. If there is insufficient memory space to record additional transactions, the fiscal application must report this condition to the host system. The host device 14 can then determine the best course of action.

When data is to be written to the fiscal data memory 38, the application executing on the host device 14 directs for a specific byte to be written to a specific address deemed to be available by the application, which maintains memory allocation information regarding the fiscal data memory 38. The BIOS of the program memory 52 then writes the data and the address to which the data is to be written to the write-protection circuit 36 at step 204. The BIOS is programmed to only attempt to write non-blank values (i.e. anything other than 0xFF) to the fiscal data memory 38 so that actual bytes of data are not mistaken for unprogrammed memory cells. At step 208, the write-protection circuit 36 then performs a read cycle for reading the data from the fiscal data memory 38 at the specified addresses. The write-protection circuit 36 then determines whether the entire destination memory block to be written to is blank (i.e. each cell has a value of 0xFF), and thus unprogrammed, at step 212. If any part of the block is not blank, the programming operation is halted, and an error status is returned by the BIOS to the application at step 216. If the destination memory block specified by the BIOS is unprogrammed, then an address is written into the address latch 66 and data is written into the data latch 64 at step 220. Next, the byte of data at the specified address is read from the fiscal data memory 38 into the data comparator 68 at step 224. If the comparator 68 detects any value other than 0xFF at step 228, then the voltage required for programming the fiscal data memory 38, Vpp, is not applied to the fiscal data memory 38 and the write-protection circuit reports a failure status at step 216 and the write process terminates. The sequence must then be restarted at step 204 by the BIOS to attempt writing to another cell. If, however, the data comparator 68 finds that the byte is equal to 0xFF (a blank) at step 228, the memory cell is considered unprogrammed and the data and address latches 58 and 60 are locked and therefore unalterable at step 232. At this point, the Vpp enable latch 70 signals Vpp switch 56 to permit the programming voltage Vpp to be applied to the fiscal data memory 26 at step 236. The memory cell in fiscal data memory 38 corresponding to the address is then programmed with the latched data at step 240. If any further data is to be stored by the write-protection circuit at step 244, then the latched address is incremented or decremented and the writing process continues at step 220. Once all of the data has been written to the fiscal data memory 38, the process is complete. The complete block of data is provided in the RAM 50 to the BIOS by the application, along with byte count and fiscal memory write address. Upon successful completion of the write operation to the fiscal data memory 38, the data in the RAM 50 may be discarded.

When data is to be read from the fiscal data memory 38, the address is written to the address latch 66 in the write-protection circuit. 36. A value of 0xFF is written into the data latch 64 in the write-protection circuit 36 to indicate that a read operation is to occur. Data at the specified address in fiscal data memory 38 may then be read. To increase access speed for sequential reading of the fiscal data memory 38, the write-protection circuit 36 automatically increments or decrements the address for each successive read operation, using a counter in address latch 66. This feature is disabled during programming of the fiscal data memory 38.

In order to better illustrate the physical security features of the invention, the assembly of the fiscal data recorder 10 and its installation in the printer 12 will now be described with reference to FIGS. 5 to 12.

Figure 5:
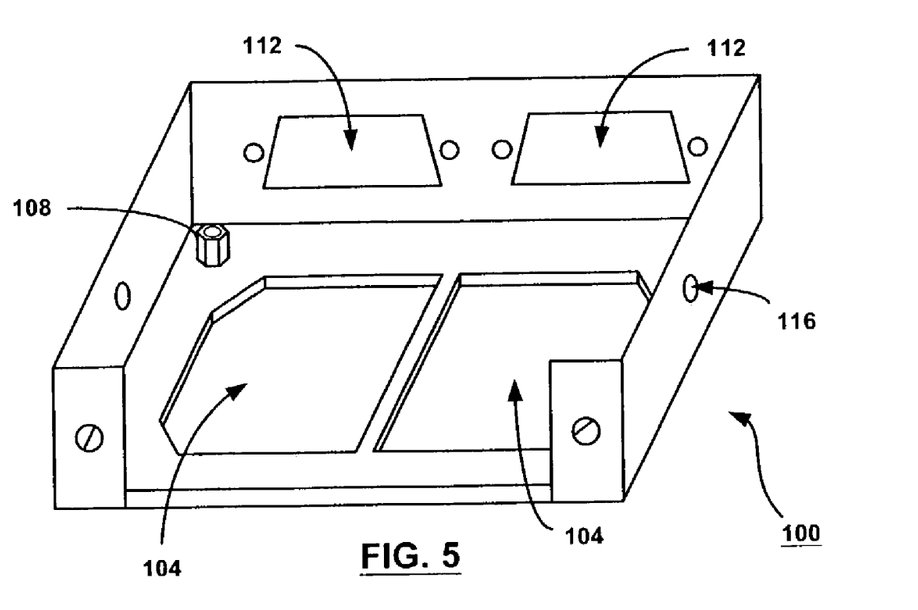
FIG. 5 is a perspective view of the chassis for the fiscal data recorder.

FIG. 5 shows a chassis 100 for the fiscal data recorder 10. The chassis 100 is typically constructed of metal and has two wells 104 for receiving the fiscal memory modules 30. The chassis has a set of four spacers 108 projecting from its base and has two port holes 112 for receiving two interface ports. Further, a through-hole 116 is provided on each side wall of the chassis 100. The chassis 100 can be marked with the serial number of the fiscal memory module to be placed therein to provide a method of visually confirming that the correct memory module is being read by the taxing authority.

Figure 6:
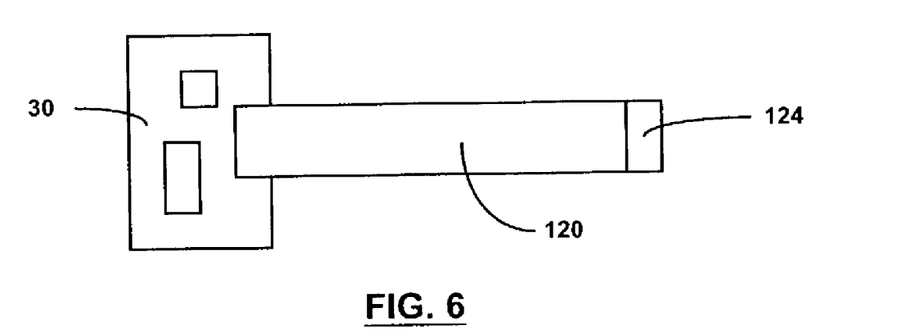
FIG. 6 is a top view of the fiscal memory module with a connected cable.

FIG. 6 shows the fiscal memory module 30 having an interface cable 120 securely attached to it and extending from it. The interface cable 120 is terminated with an interface connector 124.

Figure 7:
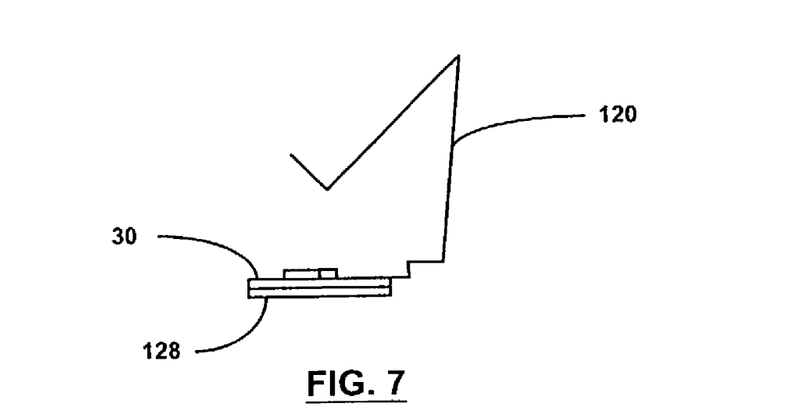
FIG. 7 is a side view of the fiscal memory module with the cable pre-bent.

FIG. 7 shows the fiscal memory module 30 having an insulating pad 128 attached to its surface to inhibit electrical contact with the chassis 100 into which the memory module 30 will be placed. Further, prior to installation into the chassis 100, the cable is bent as shown in accordance with the configuration into which it will be installed.

Figure 8:
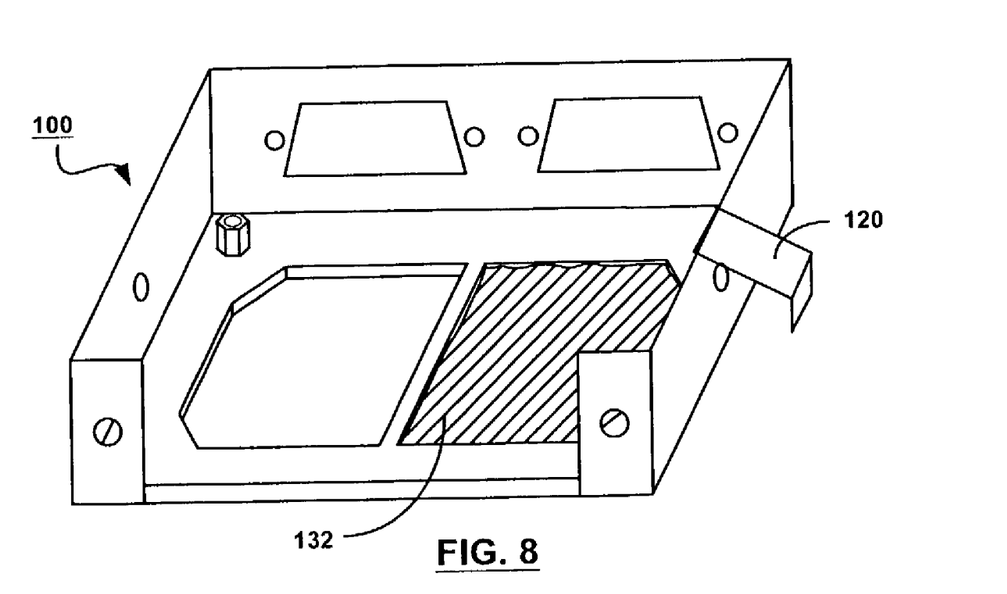
FIG. 8 is a perspective view of the chassis with the fiscal memory module affixed thereto via epoxy.

FIG. 8 shows the fiscal memory module 30 placed in one of the wells 104 of the chassis 100 and an epoxy compound 132 encasing it therein, leaving only the reading leads of the terminated cable 120 physically accessible, thus inhibiting physical tampering with the memory module 30 itself once placed and secured via epoxy into the well 104.

Once the fiscal memory module 30 has been secured to the chassis 100, the chassis 100 is ready to receive the main circuit board 20. In preparation, first the EPROM 52 is placed into its socket and tested, and a sealing label, as possibly required by the taxing authority, is placed over the EPROM 52, securing it to the main board 20, if the EPROM 52 is deemed satisfactory for use. The sealing label is designed to tear upon attempted removal of the EPROM 52 from the main board 20. The EPROM program memory 52 can be removed by an authorized tax authority representative and tested for unauthorized alterations to the firmware residing on it.

Figure 9:
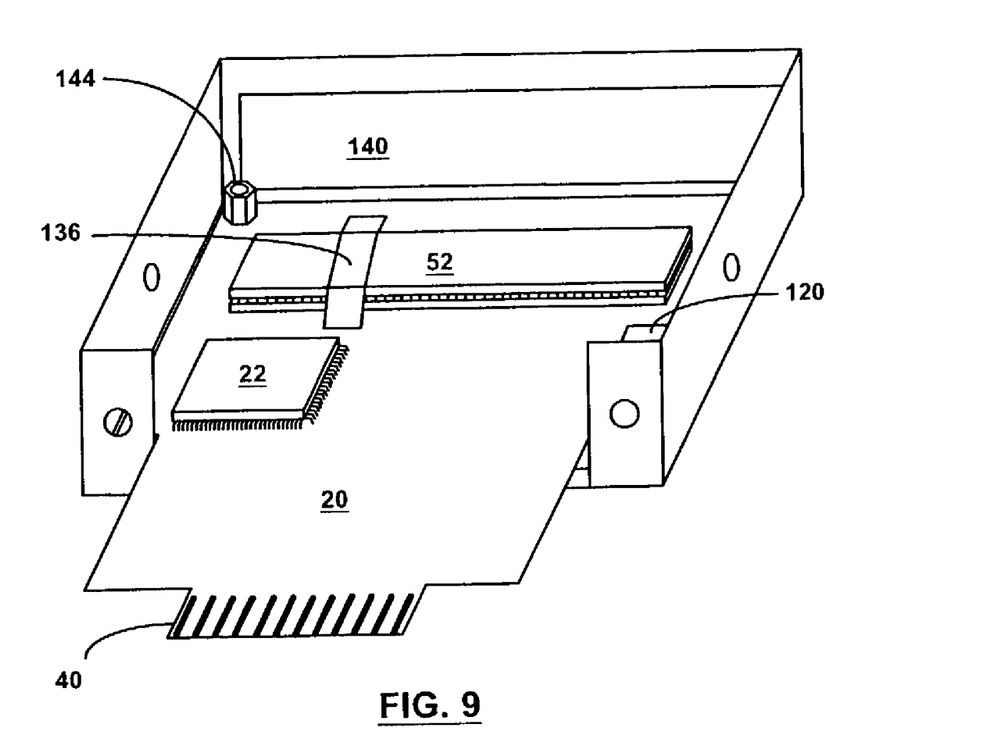
FIG. 9 is a perspective view, of the chassis after attachment of the main circuit board.

The main circuit board 20 is then placed into the chassis 100, as shown in FIG. 9, on top of the spacers 108. The sealing label 136 is shown installed on the EPROM 52. An input/output board 140 is shown plugged into the main board 20 perpendicularly and two interface ports project through the port holes 112 of the chassis (not shown). Once the board is aligned with the spacers therebelow, a second set of spacers 144 is connected to the first set 108.

Figure 10:
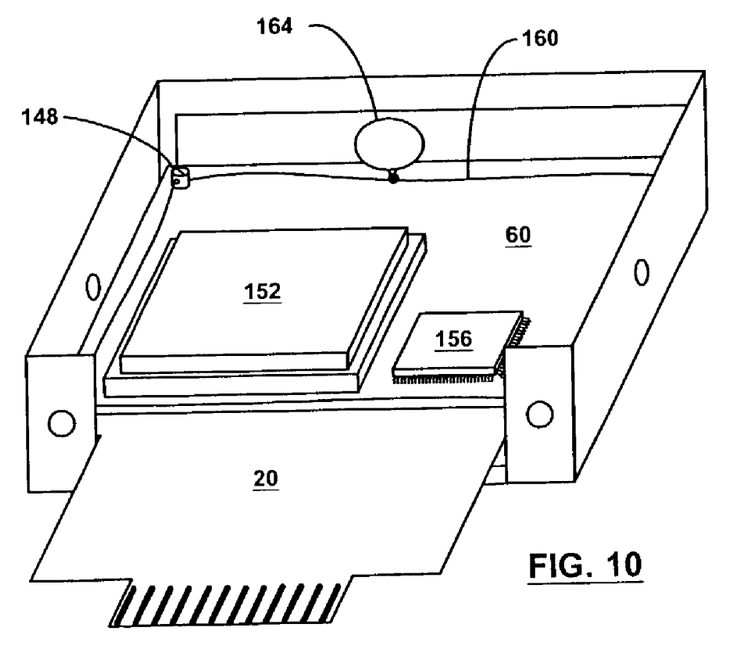
FIG. 10 is a perspective view of the chassis with the electronic journal module mounted on the chassis.

Once the electronic journal module 60 is ready to be installed into the chassis 100, it is placed atop the second set of four spacers 144 and secured thereto via four fastening screws 148, as shown in FIG. 10. The electronic journal module is shown having the compact flash memory module 152 installed thereon and a microprocessor 156. A sealing wire 160 is then threaded through holes in the fastening screws 148 and a seal 164, typically consisting of a plastic stamp, is applied to them to evidence any tampering with the wires.

Figure 11:
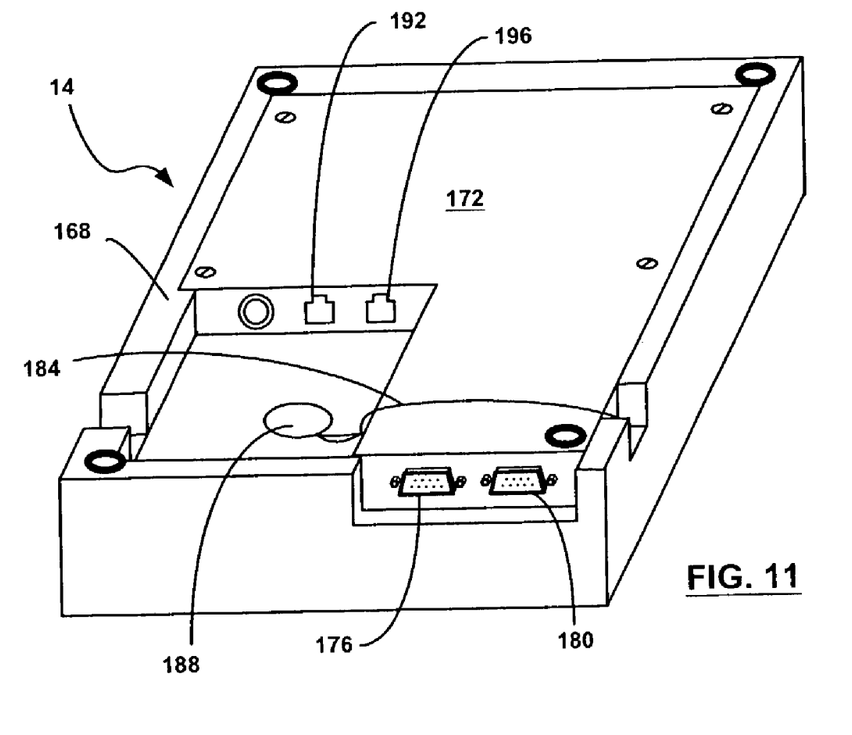
FIG. 11 is a bottom perspective view of the printer with the fiscal data recorder installed therein.

FIG. 11 shows the completed printer 12 having the fiscal data recorder 10 installed therein. The bottom of the housing 168 of the printer 12 is shown covered with a security plate 172 that is secured to the housing 168 via screws. The fiscal interface port 176 and the host interface port 180 are shown accessible through a recess in the printer housing 168. A further sealing wire 184 is then inserted through one through-hole 116 of the chassis and threaded out the other through-hole 116 and then tied around a projecting portion of the security plate 172. A seal 188 is then secured to the sealing wire 184 to evidence tampering therewith. As the seal 188 physically secures all the components of the fiscal data recorder 10, it provides an initial visual indication quick of whether the printer was disassembled.

The printer 12 is also shown having a customer display interface connector 192 and a cash drawer interface connector 196 for connecting optional components to the printer 12.

The fiscal data stored on the fiscal memory module 30 can be read through software executing on the host device 14 accessed by a taxing authority. When, however, the taxing authority wishes to audit the data collected by the fiscal data recorder 10, the tax authority can verify the integrity of the fiscal data contained in the fiscal memory module 30 by performing a number of steps. First, the seal on the exterior of the fiscal data recorder 10 is visually inspected to verify that it is intact and unbroken. Where the seal on the housing of the fiscal data recorder 10 is intact, the auditor can deem the data to have integrity. Further, the EPROM program memory can be detached from the main board 20 and tested.

In the present embodiment, the fiscal data memory is of a sufficient size that is not expected to be filled during the expected lifetime of the printer. However, should the fiscal data memory of the fiscal memory module be filled, the taxing authority can open the fiscal data recorder 10 to physically remove the fiscal memory module 30 and replace it with a fresh, unprogrammed memory module. This process may be controlled or restricted by the tax authorities.

Figure 12:
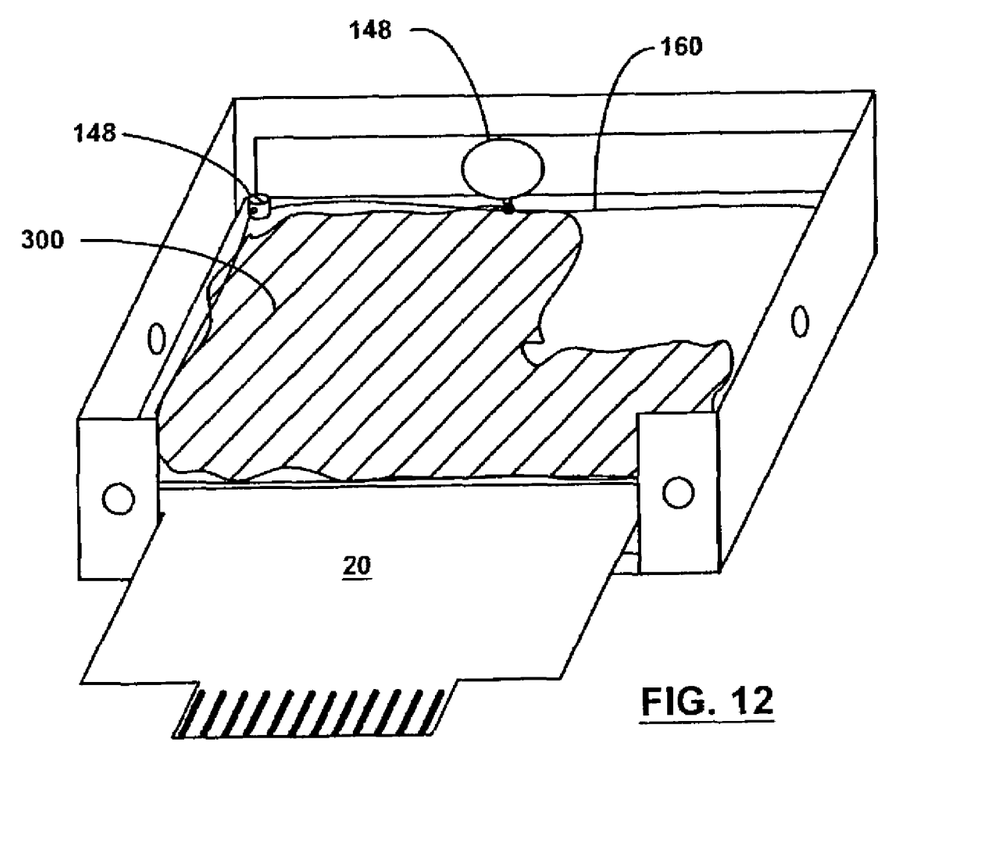
FIG. 12 is perspective view of the chassis and the electronic journal module having an epoxy coat applied to the surface, in accordance with an alternate embodiment of the invention.

FIG. 12 shows an alternative embodiment of the electronic journal module, wherein an epoxy compound 300 is applied to the surface of the module, covering the compact flash memory module and the microprocessor. The seal provided by the epoxy compound 300 can evidence physical tampering with the journal where such security is required. An example of an application where such security is required is where the electronic journal module is relied on as a confirmation of revenues for corporate tax filing purposes of the merchant.

The above-described invention allows a taxing authority to verify the integrity of the data collected via the fiscal data recorder 10. As the removable fiscal memory module 30 can only be populated with data via the BIOS of the program memory 52, as the integrity of the BIOS firmware of the program memory 52 can be verified by testing, and as each critical component is sealed to the main board 20, tampering with the fiscal data collected by the removable fiscal memory module 30 is effectively inhibited.

Although a preferred embodiment of the present invention has been described in detail, those of skill in the art will appreciate that variants may be made.

For instance, the memory capacities described herein having regard to the program memory, RAM and fiscal data memory may be increased or decreased to suit the particular environment.

Furthermore, though an OTP-EPROM has been shown as the preferred choice for the fiscal data memory, any type of memory that retains data without the application of power, and that may be programmed with data only under the application of power, could be used.

The write-protection circuit, though implemented in the preferred embodiment on a CPLD, could be implemented using different hardware technologies.

Although a preferred embodiment of the present invention has been described, those of skill in the art will appreciate that variations and modifications may be made without departing from the spirit and scope thereof as defined by the appended claims.

We claim:

1. A fiscal data recorder for storing transaction related data, comprising:
   a processing unit receiving transaction related data;
   memory communicating with said processing unit for storing said transaction related data; and
   a protection circuit acting between said processing unit and said memory, said protection circuit inhibiting electronic tampering with said memory, said processing unit commencing initialization by writing an identification pattern to the protection circuit and checking for a response; and
   wherein said protection circuit includes a store to hold data to be written to said memory and a comparator to determine whether a block in said memory to which the held data is to be written is blank, data in said store being passed to said memory only when said memory block is blank thereby preventing data stored in said memory from being overwritten; and
   wherein said protection circuit inhibits said memory from being written with blank value.

2. A fiscal data recorder according to claim 1, wherein said store includes a data latch receiving said data and an address latch using the address of a memory location in said block, said comparator receiving the address from said address latch and determining whether said memory location is blank.

3. A fiscal data recorder according to claim 1, wherein said data and address latches are locked when said comparator determines that said memory location is blank to inhibit said data and said address from being altered prior to storing said data in said memory.

4. A fiscal data recorder according to claim 3, additionally comprising:
   a voltage switch coupled to a power supply and said memory and operable to open or close a circuit to provide or deny power to said memory,
   wherein said memory is programmable only when provided programming power, and said comparator controls said voltage switch to provide programming power to said memory when said data is to be stored therein.

5. A fiscal data recorder according to claim 1, further comprising:
   a firmware program resident in a non-volatile read-only memory module coupled to said processing unit,
   wherein said processing unit is operable to relay instructions from said firmware program to said protection circuit to effect storage of transaction related data in said memory.

6. A fiscal data recorder according to claim 1, wherein said protection circuit is comprised of a complex programmable logic device.

7. A fiscal data recorder according to claim 1, further comprising:
   an electronic journal module coupled to said processing unit for recording transaction related data, said electronic journal module providing access to said recorded data to a third party for purposes of record-keeping.

8. A fiscal data recorder according to claim 7, wherein said electronic journal module is removable from said fiscal data recorder.

9. A fiscal data recorder for storing transaction related data, comprising:
   a main circuit board;
   a processing unit mounted on said main circuit board for receiving transaction related data;
   memory coupled to said main circuit board for storing transaction related data;
   a protection circuit for controlling access to said memory and inhibiting data stored in said memory from being overwritten, said processing unit commencing initialization by writing an identification pattern to the protection circuit and checking for a response; and
   a tamper-proof seal inhibiting physical access to said memory and said protection circuit; and
   wherein said protection circuit includes a store to hold data to be written to said memory and a comparator to determine whether a block in said memory to which the held data is to be written is blank, data in said store being passed to said memory only when said memory block is blank thereby preventing data stored in said memory from being overwritten; and
   wherein said protection circuit inhibits said memory from being written with a blank value.

10. A fiscal data recorder according to claim 9, wherein said tamper-proof seal also inhibits physical access to said main circuit board and said processing unit.

11. A fiscal data recorder according to claim 10, wherein said memory is one-time programmable.

12. A fiscal data recorder according to claim 11, wherein said tamper-proof seal is broken to detach said memory from said main circuit board when said memory is populated and to enable an unpopulated replacement memory to be mounted on said main circuit board.

13. A fiscal data recorder according to claim 9, wherein said protection circuit receives transaction related data from said processing unit and selectively writes said data to said memory.

14. A fiscal data recorder according to claim 13, wherein said processing unit additionally provides a memory address at which said data is to be stored, and wherein said protection circuit writes said data in said memory at said memory address if said memory address is empty.

15. A fiscal data recorder according to claim 14, further comprising:
   a power switch controlled by said protection circuit to selectively supply programming power said memory when said data is to be written to said memory.

16. A fiscal data recorder according to claim 15, wherein said protection circuit selectively directs said power switch to terminate the supply of programming power to said memory after said data has been written to said memory.

* * * * *